United States Patent [19]

Hutter

[11] Patent Number: 5,656,679
[45] Date of Patent: Aug. 12, 1997

[54] ROSIN ESTER-AMIDE SUPPORT RESINS FOR ACRYLIC LATEXES

[75] Inventor: G. Frederick Hutter, Charleston, S.C.

[73] Assignee: Westvaco Corporation, New York, N.Y.

[21] Appl. No.: 648,997

[22] Filed: May 17, 1996

Related U.S. Application Data

[63] Continuation-in-part of Ser. No. 328,796, Oct. 31, 1994, abandoned.

[51] Int. Cl.$^6$ .................................................. C09D 11/10
[52] U.S. Cl. ..................... 523/161; 524/270; 524/271; 524/272; 524/460; 106/21.41; 106/31.73; 260/DIG. 38
[58] Field of Search ........................... 523/161; 524/270, 524/271, 272, 460; 106/20 R, 23 R; 260/DIG. 38

[56] References Cited

U.S. PATENT DOCUMENTS

| | | | |
|---|---|---|---|
| 4,963,188 | 10/1990 | Parker | 106/20 R |
| 5,066,331 | 11/1991 | Hutter | 106/30 A |
| 5,152,832 | 10/1992 | Hutter et al. | 106/30 B |
| 5,182,326 | 1/1993 | LeBlanc et al. | 524/514 |
| 5,208,319 | 5/1993 | Schilling | 530/210 |

OTHER PUBLICATIONS

Floyd, D.E., *Polyamide Resins*, Reinhold Publishing Co., New York, 1958; Chapter 9: Inks (pp. 197–208).

*Encyclopedia of Polymer Science and Technology*, Interscience Publishers, John Wiley Sons, vol. 10, New York, 1969; Polyamides From Fatty Acids (pp. 597–615).

*Primary Examiner*—Paul R. Michl
*Assistant Examiner*—John J. Guarriello
*Attorney, Agent, or Firm*—Daniel B. Reece, IV; Terry B. McDaniel; Richard L. Schmalz

[57] ABSTRACT

This invention relates to improved water-soluble acrylic latex compositions. In particular, this invention relates to acrylic latex compositions produced by reacting monomers with water-soluble support resins derived from reacting a modified rosin with an alkanolamine containing at least one secondary amine and at least one hydroxyl group. These acrylic latex compositions can be utilized to produce water-based flexographic and gravure ink formulations.

6 Claims, No Drawings

5,656,679

ROSIN ESTER-AMIDE SUPPORT RESINS FOR ACRYLIC LATEXES

This application is a continuation-in-part of the parent application Ser. No. 08/328,796, now abandoned, filed Oct. 31, 1994.

FIELD OF INVENTION

This invention relates to improved water-soluble acrylic latex compositions. In particular, this invention relates to acrylic latex compositions produced by reacting monomers with water-soluble support resins derived from reacting a modified rosin with an alkanolamine containing at least one secondary amine and at least one hydroxyl group. These acrylic latex compositions can be utilized to produce water-based flexographic and gravure ink formulations.

BACKGROUND OF THE INVENTION

Aqueous flexographic and gravure inks are widely used in the industry for a number of printing purposes, including printing on plastic packaging films. Support resins employed as vehicles for such water-based flexographic and gravure ink formulations must exhibit properties such as solubility in water, wet adhesion to polypropylene film, hydrolytic stability, high melting point, and good pigment wetting.

Alcohol-soluble polyamide resins have been used extensively in inks for packaging and are commercially available. These polyamides are made from dimerized fatty acids and various polyamines such as ethylene diamine or hexamethylene diamine.

The use of such polyamide resins in ink compositions is described in Floyd, D. E., *Polyamide Resins*, Reinhold Publishing Co., New York, 1958 and in the *Encyclopedia of Polymer Science and Technology*, Interscience Publishers, John Wiley Sons, Volume 10, New York, 1969. A typical commercial product is GAX-340 manufactured by Henkel.

For water-based ink, a water-soluble support resin such as acrylic resin or a conventional soluble maleic resin may be used. Acrylic support resins have good film properties, but lack adhesion to polyolefin films.

Conventional soluble maleic resins, which contain half-esters, are subject to a certain degree of hydrolytic instability under alkaline conditions. They also lack film toughness.

Water-based ink compositions are taught in U.S. Pat. No. 4,963,188 to be prepared by free radical polymerization of rosin and maleic anhydride. Modification of the polymer with an alcohol or an amine prior to utilization in preparing the ink composition is disclosed.

Recently, water-soluble resins having qualities of adhesion and wettability for use in packaging ink compositions were developed as the reaction products of rosin modified by Diels-Alder reaction with an $\alpha,\beta$ unsaturated acid and a compound containing two secondary amine groups, including commercially available piperazine and N,N'-dimethylethylene diamine. These resins are described in U.S. Pat. No. 5,066,331.

Such resins were developed primarily for use in water/isopropanol-based inks for printing on film, where they perform quite satisfactorily. When using these resins in all-water systems (i.e., no alcohol), it was found that the resin solutions had relatively limited shelf stability. In many cases the solutions gel upon standing for two or three days.

U.S. Pat. No. 5,152,832 (which is hereby incorporated by reference) corrected this gelling problem by teaching the use of a resin derived from the reaction products obtained by reacting a modified rosin with a compound containing two secondary amine groups, and further modifying said reaction products with a polyol (such as diethylene glycol).

However, a major problem develops when one attempts to utilize the resins taught in U.S. Pat. No. 5,152,832 as support resins for emulsion polymerizations. These resins form excessive grit whenever they are employed in this manner. This characteristic renders these resins totally unsuitable for use as support resins for making acrylic latexes.

The present invention solves this problem by teaching acrylic latex compositions formed by reacting a monomer with a support resin derived from the reaction products obtained by reacting a modified rosin with an alkanolamine compound containing at least one secondary amine and at least one hydroxyl group. Thus, by requiring that the amine and hydroxyl groups be contained in the same molecule (rather than in two separate ones), the present invention utilizes a support resin which substantially differs from resin taught in U.S. Pat. No. 5,152,832.

Therefore, it is an object of this invention to provide improved acrylic latex compositions which may be used to prepare water-based flexographic gravure ink formulations.

SUMMARY OF THE INVENTION

The above object is met by an acrylic latex composition comprising the acrylic polymer reaction product formed by the addition polymerization of (A) a member selected from the group consisting of acrylic monomers, styrenic monomers, and combinations thereof, in the presence of (B) a water-soluble support resin having a number average molecular weight of no more than 2,000; wherein said support resin is the reaction product formed by sequentially modifying a rosin, first with a member selected from the group consisting of fumaric acid, maleic acid, maleic anhydride, itaconic acid, itaconic anhydride, and combinations thereof, and second, with an alkanolamine containing at least one secondary amine and at least one hydroxyl group.

DESCRIPTION OF THE PREFERRED EMBODIMENT

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin, and tall oil rosin.

It is generally known in the art that $\alpha,\beta$-unsaturated acids and their anhydrides, such as maleic acid, maleic anhydride, itaconic acid, itaconic anhydride, and fumaric acid may be reacted with abietic type rosin acids to yield $C_{24}$ or $C_{25}$ polycyclic tricarboxylic acids and anhydrides. Examples include the reaction product of levopimaric acid reacted with fumaric acid, i.e., fumaropimaric acid (I) and the product of levopimaric acid reacted with maleic anhydride, i.e., maleopimaric acid anhydride (II), as described in Kirk-Othmer, *Encyclopedia of Chemical Technology*, 3rd Edition, Vol. 20, Wiley-Inter-Science Publications, John Wiley & Sons, New York, 1978:

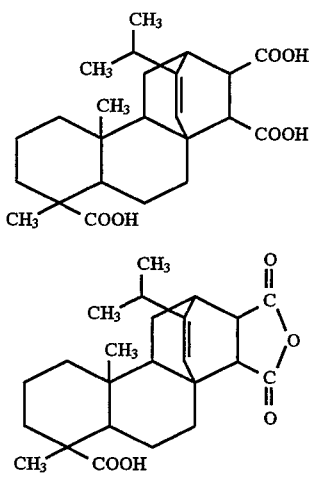

The water-soluble support resins utilized in the present invention are the reaction products created by reacting a rosin: (1) first with a member selected from the group consisting of fumaric acid, maleic acid, maleic anhydride, itaconic acid, itaconic anhydride, and combinations thereof, and (2) second, with an alkanolamine containing at least one secondary amine and at least one hydroxyl group.

Alkanolamines which are suitable for use in the present invention include, but are not limited to, the following:

N-methylethanolamine,

N-ethylethanolamine,

N,N'-bis(2 hydroxyethyl)ethylenediamine, diethanolamine, diisopropanolamine, and combinations thereof.

The reaction should be carried out at a relatively low temperature (below about 235° C., preferably about 200° C.) so that reaction of the secondary carboxyls of the rosins is favored over the tertiary ones and to avoid chain branching. Support resins suitable for use in the present invention have number average molecular weights of no greater than about 2,000; with the preferred number average molecular weights being no greater than 1,400. Since rosin typically cannot be fully maleated or fumarated, resin made by the above process will contain a certain amount of unreacted rosin, which acts as a plasticizer and reduces the softening point of the resin. The softening point can be increased either by using a rosin that has a relatively higher content of abietic-type rosin acids, such as gum rosin, and, thus, can be maleated or fumarated to a greater extent, or by using maleated or fumarated rosin that has been vacuum stripped to remove part of the unreacted rosin.

The support resins are combined with monomers to prepare acrylic latexes for use in formulating water-based flexographic and gravure printing inks. Monomers which are suitable for use in preparing acrylic latexes include, but are not limited to, the following:

styrene,

α-methyl styrene, vinyl toluene, acrylic esters, methacrylic esters, and mixtures thereof.

The following examples are provided to further illustrate the present invention and are not to be construed as limiting the invention in any manner.

EXAMPLE 1

To a 2000 milliliter flask equipped with a mechanical stirrer and nitrogen sparge were charged 1000.0 grams tall oil rosin, 2.6 grams tributyl phosphite, and one drop Dow-Corning antifoam A. The charge was heated to 170° C., and 250.0 grams fumaric acid was added. The charge was further heated to 200° C. and held at that temperature for two hours. Then 133.0 grams of diisopropanolamine was added, and the charge was further heated to 210° C., where it was held until the acid number was 175. The product was a clear resin with a ring-and-ball softening point of 132° C. Solutions of this support resin at 25% solids in aqueous ammonia at pH 9 to 10 were stable, remained clear, and showed no precipitation for a period of nine weeks.

EXAMPLE 2

A series of support resins were prepared using the procedure of Example 1 wherein the diisopropanolamine was replaced with equimolar amounts of other alkanolamines. These resins (and Resin No. 1) are listed in Table I below.

TABLE I

| Rosin Ester-Amide Support Resins | | | |
|---|---|---|---|
| Resin No. | Alkanolamine Component, Parts per 100 Parts of Rosin* | Acid No. | S.P. °C. |
| 1 | 13.3 Diisopropanolamine | 175 | 132 |
| 2 | 11.3 N-Methylethanolamine | 174 | 120 |
| 3 | 13.4 N-Ethylethanolamine | 166 | 118 |
| 4 | 10.5 Diethanolamine | 182 | 134 |

*Resins also contain 25 parts per hundred rosin fumaric acid.

The above-noted support resins exhibited excellent solubilities in water, wet adhesions to polypropylene film, hydrolytic stabilities, high melting points, and good pigment wettings.

The rosin ester-amides in Table I were used as support resins for formulating fill-forming acrylic latex compositions via the following procedure. To a 2-liter four-neck distilling flask equipped with a mechanical stirrer was added 23.0 parts of rosin ester-amide support resin dissolved in 132.0 parts deionized water. The pH of this resin solution was set at about 8.5 with the required mount of ammonium hydroxide. To the resin mixture was added 5.0 parts of sulfated alkyphenoxypoly(ethyleneoxy) ethanol surfactant in 11.7 parts water, and 3.0 parts octylphenoxypoly (ethyleneoxy) ethanol surfactant in 1.3 parts water. This mixture was heated under a nitrogen blanket to 85° C., at which time a monomer charge of 5.3 g of styrene and 4.7 g of butyl acrylate was added to the flask, followed by the addition of 0.44 parts ammonium persulfate in 1.3 parts DI water. This initial charge of monomer was allowed to react for 30 minutes. Afterwards, a monomer charge of 47.7 g of styrene and 42.3 g of butyl acrylate was added over a period of 120 minutes. An additional 0.44 parts ammonium persulfate in 1.3 parts water was added 60 minutes into the addition of the remaining monomer. When the monomer was completely added the emulsion was held at 85° C. for 30 minutes and then 0.13 parts ammonium persulfate was added. The emulsion was stirred for 120 minutes at 85° C. before being cooled and filtered. The final pH was adjusted to 8.3–8.4 with the required amount of ammonium hydroxide. The properties of the acrylic latex compositions are shown in Table II below.

A series of water-based flexographic and gravure inks were prepared using these acrylic latex compositions as vehicles via the following formula:

| | |
|---|---|
| Vehicle | 41.6 |
| Water | 16.0 |
| Isopropyl alcohol | 14.4 |
| FLEXIVERSE phthalo blue base (manufactured by Sun Chemical, Inc.) | 28.0 |

Prints from the inks were made on Mobil LCM treated, biaxially oriented polypropylene with a K-Coater using the KCC bar number 3, and subsequently dried in a forced air oven at 250° F. for 20–30 seconds. Morton laminating adhesive 77T623 was applied to the dried ink surface using the K-Coater and the number 3 bar. The adhesive was dried using the same conditions as for the ink. A sheet of 92 LBT. 12 gage polyester (manufactured by DuPont, Inc.) was laid onto the printed sheet, and the rubber roll of a flexo hand proofer was rolled over the combined sheets to remove all air pockets. The resultant sandwich was placed in a Sentinel heat seal machine for 5 seconds at 250° F. and 60 psi to produce the final laminate. The laminates were cut into one-inch strips for peeling on a tensile tester.

The results from the peel tests are listed in Table II below.

TABLE II

Acrylic Latex Composition Properties

| Resin No. | Latex No. | Solids, Wt % | pH | Viscosity, cP | Particle Size, nm | Peel Strength, g/inch |
|---|---|---|---|---|---|---|
| 1 | 1 | 44.2 | 8.6 | 8800 | 46 | 285 |
| 2 | 2 | 46.8 | 8.4 | 108 | 64 | 302 |
| 3 | 3 | 48.5 | 8.5 | 70 | 96 | 198 |
| 4 | 4 | 45.1 | 8.4 | 147 | 204 | 212 |

The acrylic latex compositions produced via the present method were suitable for use in formulating water-based inks (that is, none of the latexes formed excessive grit). Furthermore, all the inks produced exhibited good-to-excellent peel strengths in plastic film laminates.

Many modifications and variations of the present invention will be apparent to one of ordinary skill in the art in light of the above teachings. It is, therefore, understood that the scope of the invention is not to be limited by the foregoing description, but rather is to be defined by the claims appended hereto.

What is claimed is:

1. An acrylic latex composition comprising the acrylic polymer reaction product formed by the addition polymerization of (A) a member selected from the group consisting of acrylic monomers, styrenic monomers, and combinations thereof, in the presence of (B) a water-soluble support resin having a number average molecular weight of no more than 2,000; wherein said support resin is the reaction product formed by sequentially modifying a rosin, first with a member selected from the group consisting of fumaric acid, maleic acid, maleic anhydride, itaconic acid, and itaconic anhydride, and second, with an alkanolamine containing at least one secondary amine and at least one hydroxyl group.

2. The acrylic latex composition of claim 1 wherein the monomer is a member selected from the group consisting of styrene, α-methyl styrene, vinyl toluene, acrylic esters, methacrylic esters, and combinations thereof.

3. The acrylic latex composition of claim 1 wherein the support resin has a number average molecular weight of no more than 1,400.

4. The acrylic latex composition of claim 1 wherein the rosin is derived from a member of the group consisting of tall oil rosin, gum rosin, and wood rosin.

5. The acrylic latex composition of claim 1 wherein the alkanolamine is a member selected from the group consisting of diethanolamine, N-methylethanolamine, N-ethylethanolamine, diisopropanolamine, N,N'-bis (2hydroxyethyl)ethylenediamine, and combinations thereof.

6. A water-based ink comprising the acrylic latex composition of claim 1 and a pigment dispersion.

* * * * *